(12) United States Patent
Odaohhara et al.

(10) Patent No.: US 6,574,740 B1
(45) Date of Patent: Jun. 3, 2003

(54) DYNAMIC POWER CONSUMPTION CONTROL FOR A COMPUTER OR OTHER ELECTRONIC APPARATUS

(75) Inventors: Shigefumi Odaohhara, Yamato (JP); Arimasa Naitoh, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/455,661

(22) Filed: Dec. 7, 1999

(30) Foreign Application Priority Data

Dec. 7, 1998 (JP) .......................................... 10-347278

(51) Int. Cl.[7] ................................................ G06F 1/30
(52) U.S. Cl. ...................... 713/323; 713/320; 713/340
(58) Field of Search .......................... 713/1, 330, 320, 713/340, 323; 320/115

(56) References Cited

U.S. PATENT DOCUMENTS

| | | | | |
|---|---|---|---|---|
| 5,483,656 A | * | 1/1996 | Oprescu et al. ............. | 700/297 |
| 5,799,069 A | * | 8/1998 | Weston et al. ............... | 375/222 |
| 5,964,879 A | * | 10/1999 | Dunstan et al. ............. | 713/320 |
| 6,255,800 B1 | * | 7/2001 | Bork .......................... | 320/115 |
| 6,367,023 B2 | * | 4/2002 | Kling et al. ................. | 713/340 |

FOREIGN PATENT DOCUMENTS

| | | |
|---|---|---|
| JP | 05-307431 | 11/1993 |
| JP | 10-198455 | 7/1998 |

* cited by examiner

*Primary Examiner*—Thomas Lee
*Assistant Examiner*—Yasin Barqadle
(74) *Attorney, Agent, or Firm*—Bracewell & Patterson LLP

(57) ABSTRACT

Disclosed is a method and apparatus for controlling power consumption of the PC, which is provided with base loads comprising a plurality of components, as well as a CPU including operation modes of "throttling" and "clock-down". Actual power consumption 103 of the CPU in a certain operation mode varies heavily or widely within a range of maximum power consumption of the CPU. A variation of actual power consumption 101 of the base loads is relatively gentle or mild. Predicted maximum power consumption (Pmax) of the PC is obtained from actual power consumption of the base loads and maximum power consumption in the current operation mode of the CPU. Reference power vales 121, 123, 125 are set up such that they are compared with the Pmax for changing an operation mode to another operation mode. When the Pmax exceeds a reference power vale, the operation mode of the CPU is changed for controlling actual power consumption of the PC.

17 Claims, 8 Drawing Sheets

| Thermal Level | 5 | | 4 | | 3 | | 2 | | 1 | |
|---|---|---|---|---|---|---|---|---|---|---|
| Thermal Operation | Power Off | | Suspend | | Throttling 25% | | Throttling 50% | | Fan Operation | |
| Sensor Position | Enable | Disable | Enable | Disable | Enable | Disable | Enable | Disable | Enable | Disable |
| CPU Card | 80 ℃ | N/A | 78 ℃ | N/A | 75 ℃ | 71 ℃ | 73 ℃ | 68 ℃ | 71 ℃ | 66 ℃ |
| DC/DC Card | 71 ℃ | N/A | 69 ℃ | N/A | 66 ℃ | 58 ℃ | 60 ℃ | 55 ℃ | 55 ℃ | 50 ℃ |
| Video Card | 82 ℃ | N/A | 80 ℃ | N/A | 78 ℃ | 74 ℃ | 76 ℃ | 71 ℃ | 74 ℃ | 69 ℃ |
| Multimedia Card | 65 ℃ | N/A | 63 ℃ | N/A | 62 ℃ | 58 ℃ | 60 ℃ | 55 ℃ | 58 ℃ | 53 ℃ |
| Planar Board | 66 ℃ | N/A | 64 ℃ | N/A | 63 ℃ | 60 ℃ | 62 ℃ | 57 ℃ | 60 ℃ | 55 ℃ |
| Main Battery | 72 ℃ | N/A | 70 ℃ | N/A | 69 ℃ | 65 ℃ | 68 ℃ | 63 ℃ | 66 ℃ | 61 ℃ |
| Auxiliary Battery | 72 ℃ | N/A | 70 ℃ | N/A | 69 ℃ | 65 ℃ | 68 ℃ | 63 ℃ | 66 ℃ | 61 ℃ |
| Predicted Maxim. Power Consumption Pmax | N/A | N/A | 55W | N/A | 52W | 50W | 50W | 45W | N/A | N/A |

DYNAMIC POWER CONSUMPTION CONTROL FOR A COMPUTER OR OTHER ELECTRONIC APPARATUS

BACKGROUND OF THE INVENTION

Pursuant to 35 U.S.C. 119, Applicants claim the benefits of Japanese Application No. 10-347278, which was filed of Dec. 7, 1998. This Japanese patent application and its translation are incorporated into this application by reference.

This invention relates to a technique for dynamically controlling power consumption of an electronic apparatus such as a computer or the like and, more particularly, to a method and an apparatus for use in a computer, which is provided with loads such as a central processing unit (CPU) and/or a display device each with its power consumption being adjustable, to dynamically control power consumption of a portion of the loads in accordance with a predicted result of maximum power consumption of the computer, thereby to limit its power consumption to a predetermined value or less.

In general, a portable computer (hereinafter simply called "computer") has a smaller size and a lighter weight to enrich its portability and, thus, so long as it is equipped with a battery pack, it is adapted for use in any location where no AC power supply is available. Conversely, in a location where an AC power supply is available, an AC power adapter (hereinafter called "AC adapter") is normally connected to an electric outlet of a commercial power supply for feeding DC power to system loads within the computer and for recharging its internal batteries. Thus, a user may bring an AC adapter whenever he/she carries his/her computer. Recently, functions and performance of a portable computer are being dramatically enhanced, and this results in a continuous increase in power consumption of a computer. Keeping pace with such a trend, capacity of an AC adapter is inclined to increase as well. Obviously, such an inclination is unfavorable to a portable computer that attaches importance to its portability.

Japanese Patent Publication No. 5-241769 discloses a technique for controlling maximum power consumption of a computer, whereby brightness of a display device of the computer may be increased to its maximum level within capacity of a given AC adapter. In this technique, when a user adjusts brightness of a liquid crystal display (LCD) to cause its load current to be changed, a charge control circuit is responsive thereto for automatically controlling charging time, thereby adjusting a current of the circuit. As a result, a sum of the currents for the LCD and charge control circuit is so controlled as not to exceed the capacity of the AC adapter, whereby the user is allowed to freely change the brightness within an adjustable range of the charging time.

With this technique, however, the charging time corresponding to the brightness of the LCD is so set up previously as not to exceed the capacity of the AC adapter, and when the user selects the brightness or power consumption of the LCD to be a certain value., the charging time or power consumption of the charge control circuit is caused to be adjusted accordingly. Since there exist one or more loads in the computer (which constitute the computer system) besides the LCD and the charge control circuit, power to be consumed thereby is fed from the AC adapter as well. Also, power consumption of the entire system load varies, depending on or in accordance with a particular operation being carried out by the computer. For example, when a CD-ROM drive is being accessed for reproducing any animation on the LCD, a larger amount of power is consumed, whereas in another case of creating a document with static images alone, a smaller amount of power is consumed.

In said technique, on a premise that power consumption of the system load is always equated with maximum power consumption, a combination of power consumption of the LCD and the charge control circuit has been set up such that power consumption of the entire computer is confined within the capacity of the AC adapter. However, since actual power consumption of the system load varies in accordance with an operating state of the computer as mentioned above, it is far less than the maximum power consumption. As a result, there occurs a waste of the capacity of the AC adapter in proportion to a difference between the maximum power consumption of the system load and actual power consumption. Further, this technique does not disclose any means for predicting the maximum power consumption of the computer, nor does it disclose any means for dynamically adjusting power consumption of a load in accordance with the predicted result.

Therefore, it is an object of this invention to provide a method and an apparatus for predicting maximum power consumption of an electronic apparatus and for dynamically controlling power consumption of a portion of its loads in response to the predicted result, thereby to limit its power consumption to a predetermined value or less.

It is another object of this invention to provide a method and an apparatus for predicting maximum power consumption of a computer and for temporarily changing a function of its CPU or LCD in response to the predicted result while the computer is operating to control its power consumption, thereby limiting its power consumption to a predetermined value or less.

It is yet another object of this invention to provide a method and an apparatus adapted for use in an electronic apparatus, which is fed power by a given AC adapter, for effectively making use of capacity of the adapter without needlessly increasing the capacity thereof.

SUMMARY OF THE INVENTION

Power consumption of an electronic apparatus such as a computer or the like varies in accordance with a type of its processed data or an operating state. This invention may be applied to an electronic apparatus, which includes a load with its power consumption being adjustable (hereinafter called "controlled load") and a set of loads comprising a plurality of components (hereinafter called "base loads"). The controlled load has a plurality of operation modes corresponding to functional levels in such a manner that when the operation modes are switched or changed from one to another, maximum power consumption of the controlled load and its actual power consumption are varied accordingly. On the other hand, actual power consumption of the base loads is, in general, far less than a sum of maximum power consumption of each component, and this power consumption varies as a result of a change in an operating state of the electronic apparatus.

In one aspect of this invention, there is provided a method of controlling power consumption of a computer, which is provided with base loads comprising a plurality of components, and a CPU including a plurality of operation modes associated with power consumption thereof, the method comprising the steps of: obtaining predicted maximum power consumption of said computer from actual power consumption of said base loads and maximum power consumption in a current operation mode of said CPU; providing reference power; comparing said predicted maximum power consumption with said reference power; and changing the operation mode of said CPU in response to said comparing step. It is clear from the description of the present specification, however, that application of this invention is not limited to controlling of power consumption of a computer, since this invention is broadly applicable to controlling of power consumption of a conventional electronic apparatus as well. Also, the load including a plurality of operation modes associated with power consumption thereof is not limited to a CPU alone, since it may be any load so long as its power consumption is changeable, i.e., any member of the so-called "controlled loads". Note here that the expression, "operation modes associated with power consumption", refers to one or more operation modes of intermediate states (each being capable of consuming a certain amount of power) between the most active operation mode (wherein the controlled load consumes its maximum power) and the most inactive operation mode (wherein the controlled load is stopped), and that upon setting one of the operation modes, maximum power consumption in this operation mode so set up is determined, thereby to confine its actual power consumption within the said maximum power consumption.

A CPU runs in synchronization with timing of clocks. Thus, a program can be executed even if clocks are not successively sent at a predetermined frequency. Recognizing such behavior, there has been developed a known technique of an operation mode, called "throttling", for controlling power consumption and/or a temperature rise by periodically stopping clocks of the CPU for a predetermined time interval. Changing a duty cycle of the throttling, maximum power consumption of the CPU can be controlled accordingly. Also, in a normal state of CMOS transistor circuit within the CPU, there is little current flowing through it. In other words, most of the current flows in synchronization with clock timing if and only if a combination of input signals to the circuit is changed. Recognizing such behavior, there has been developed another known technique of an operation mode, called "clock-down", for controlling power consumption and/or a temperature rise by controlling operating frequencies of the CPU. While a processing rate of a program is degraded as a result of executing the throttling and/or the clock-down, nevertheless it is possible to reach at a tradeoff between such a performance degradation and a decrease of power consumption of the CPU.

Also, there is another known technique of an operation mode, called "standby", for reducing power consumption by stopping clock feeding to arithmetic units and the like (except a portion of peripheral circuits such as an interrupt circuit, a timer circuit, and the like) while contents of registers are being kept therein. Further, there is another known technique of an operation mode, called "suspend", for reducing power consumption by causing most of the devices (except a memory, an interrupt circuit, and the like) to be stopped while an execution state of a program is being saved to the memory. When an operation of a computer is to be started from the suspend state, the computer can be returned to an operating state immediately before the suspend state in a short period of time, since the memory saves the operating state just before the suspend state. This is called "resume". Relatedly, there is a known technique, called "hibernation", for completely stopping a computer by storing such a state immediately before stoppage of a CPU into an auxiliary storage device and by stopping a memory as well. Note in this respect that this invention makes is capable of exploiting a variety of operation modes in a CPU as described above, in addition to any technique for controlling maximum power consumption and actual power consumption of a CPU by means of dynamically changing its operation modes.

The predicted maximum power consumption is obtained from actual power consumption of the base loads and maximum power consumption in a current operation mode of the controlled load or CPU. While actual power consumption of the CPU varies heavily or widely in accordance with a type of an executing program and its execution state, maximum power consumption of the CPU is determined by its operation mode. On the other hand, actual power consumption of the base loads varies in accordance with addition of one or more peripheral devices (e.g., a PCMCIA card, an auxiliary storage device, and the like) to the computer, as well as a change in their operating states, but its variation while the computer is operating is not heavy as much as that of the CPU. Thus, even if power consumption of the CPU varies widely, a summed value of actual power consumption of the base loads and maximum power consumption in a current operation mode of the CPU has significance as a predicted value of maximum power consumption of the computer. Note in this respect, however, that the predicted maximum power consumption of this invention is not necessarily obtained by simply adding actual power consumption of the base loads and maximum power consumption in a current operation mode of the CPU. This is because it can be similarly obtained by all of possible calculation methods, including but not limited to introduction of an experimental factor and/or exploitation of another logical operation, which make use of actual power consumption of the base loads and maximum power consumption in a current operation mode of the CPU for calculating the predicted maximum power consumption.

The reference power, which is set up to have a value associated with allowable power of the electronic apparatus or the computer, is utilized for changing the operation modes of the CPU from one to another. Alternatively, the reference power may be arranged to have a plurality of values corresponding to the operation modes of the CPU. Namely, if the CPU is running in one of the operation modes that requires a larger amount of maximum power consumption, then a smaller value of the reference power may be applied to change this operation mode. Conversely, if the CPU is running in another operation mode that requires a smaller amount of maximum power consumption, then a larger value of the reference power may be applied to change this operation mode. Further, the reference power may be arranged to have different values, each being respectively associated with a first case (wherein power consumption of the base loads increases, thereby changing the operation modes of the CPU in such a direction as to decrease its maximum power consumption toward a smaller amount) and a second case (wherein power consumption of the base loads decreases, thereby changing the operation modes of the CPU in such a direction as to increase its maximum power consumption toward a larger amount). Obviously, the reference power may include a margin to prevent power consumption of the computer from exceeding the allowable power because of an unexpected sudden increase in the base loads.

Comparing the predicted maximum power consumption with the reference power, it is possible to determine whether or not actual power consumption of the computer possibly exceeds the reference power. If the predicted maximum power consumption is equal to or less than the reference power, actual power consumption of the computer does not exceed the reference power, so long as actual power consumption of the base loads does not suddenly increase. This is true even when power consumption of the CPU suddenly increases. A value of the reference power is different for each type of the allowable power of the computer. For example, in a case of feeding power to the computer from an AC adapter, it is possible to set up a value associated with capacity of the AC adapter. Alternatively, it is possible to set up a value associated with an operational value of a safety device in an electric system and/or a limit of a temperature rise.

If, as a result of said comparison, the predicted maximum power consumption is determined to exceed the reference power, then the operation mode of the CPU is changed from one to another. For example, if the CPU is running in a normal operation mode consuming a larger amount of actual power consumption, and if the predicted maximum power consumption exceeds the reference power due to an increase of actual power consumption of the base loads, then the CPU is changed to the throttling mode. In general, actual power consumption of the CPU is smaller than maximum power consumption of its operation mode and, thus, actual power consumption of the computer does not exceed the reference power nor the allowable power. Accordingly, by means of changing the operation modes, maximum power consumption of the CPU is decreased and, at the same time, the predicted maximum power consumption is caused to be lowered than the reference power. Thus, so long as actual power consumption of the base loads does not suddenly increase, actual power consumption of the computer does not exceed the allowable power.

Causing maximum power consumption of the CPU to be decreased as a result of changing its operation modes, it leads to a degradation of a function of the CPU. Thus, in a case where the base loads are decreased to cause the predicted maximum power consumption to be lowered sufficiently below the reference power, it is preferable to recover the function by changing the operation modes of the CPU from the throttling mode to the normal operation mode. This results in an increase in maximum power consumption of the entered normal operation mode of the CPU. In this way, by changing the operation modes of the CPU in response to a comparison result of the predicted maximum power consumption and reference power for controlling both of maximum power consumption and actual power consumption of the CPU, it is possible to provide the computer that is operable at its actual power consumption maintained to be lower than the allowable power without needlessly degrading the function of the CPU.

In another aspect of this invention, when maximum power consumption is determined to exceed the reference power as a result of said comparison, brightness of a display device is adjusted. Power consumption of the display device such as an LCD varies in accordance with a change in its brightness. Accordingly, by decreasing the brightness in accordance with an increase in power consumption, and by limiting a user's brightness adjustment, it is possible to control power consumption of the computer.

Yet another aspect of this invention comprises a step of changing the operation modes of the CPU from one to another, when a sum of actual power consumption of the base loads and actual power consumption of the CPU exceeds the reference power of the computer. Even though the predicted maximum power consumption is so controlled as not to exceed the reference power, if there is a sudden change in the base loads, it may happen that actual power consumption of the computer exceeds both of the reference power and the allowable power. In such a case, depending on a type of the allowable power, occurrence of a problem may be prevented by lowering the actual power consumption below the allowable power in a short period of time. For example, when capacity of an AC adapter is selected to be the allowable power, it is preferable to select such an AC adapter that can tolerate overloading of a short period.

In another aspect of this invention, there is provided a method adapted for use in a computer, which is provided with a display device with its brightness being adjustable, for more securely limiting its power consumption to the reference power or less. While an exemplary display device is an LCD, the scope of this invention includes, but not limited to the LCD alone, any display devices for a computer as long as its power consumption varies as a result of its brightness adjustment. As known in the art, the brightness of the LCD may be appropriately changed by a user at any time, and an increase in the brightness leads to a sudden increase in power consumption of the LCD. Thus, if the predicted maximum power consumption is previously calculated from maximum power consumption of the LCD at the time of adjusting its brightness to the maximum level, actual power consumption of other base loads, and maximum power consumption in a current operation mode of the CPU, then it is possible to control in such a way that actual power consumption of the computer does not exceed the allowable power.

DESCRIPTION OF THE PREFERRED EMBODIMENTS

Figure 1:
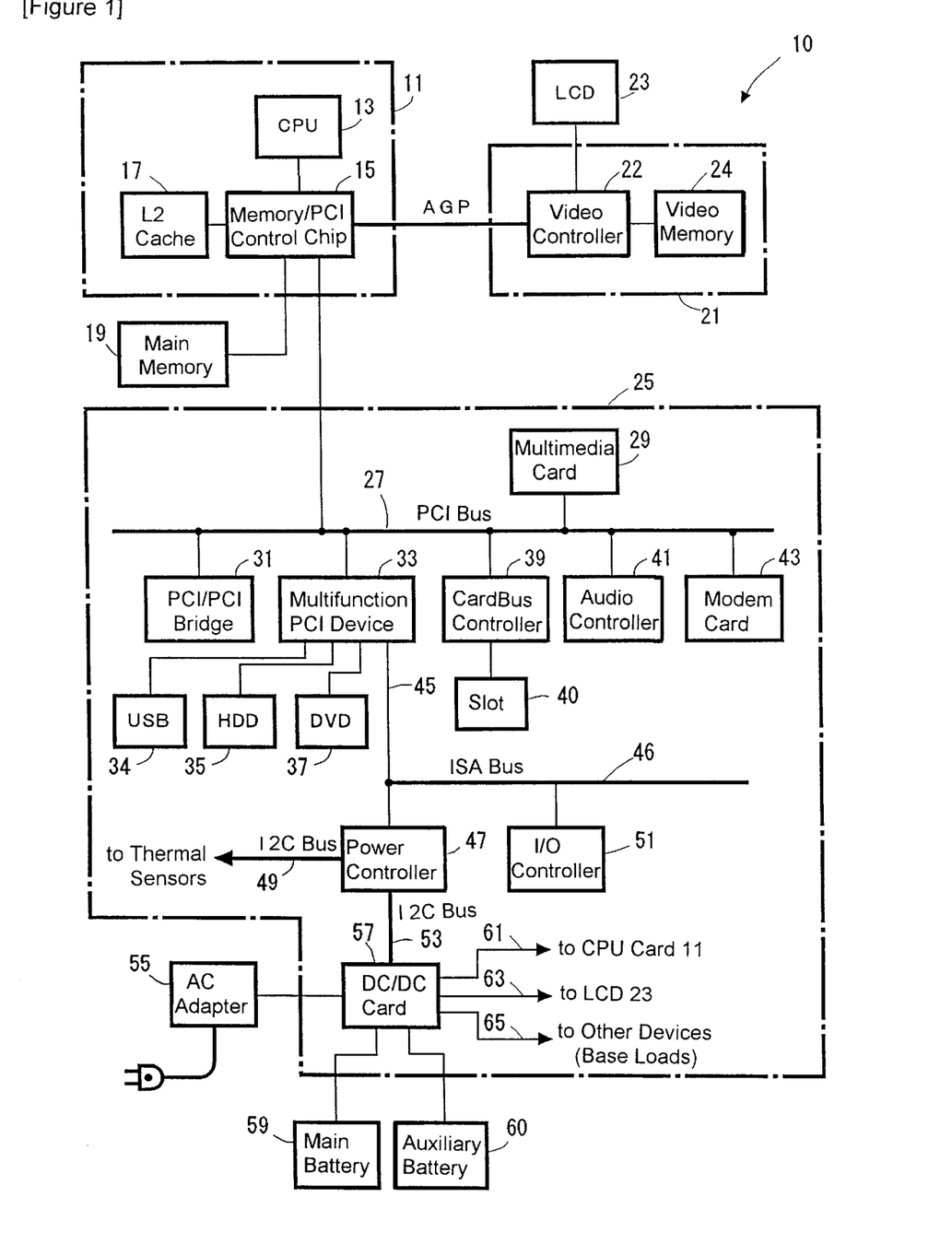
FIG. 1 is a schematic block diagram showing an embodiment of a computer 10 in accordance with this invention.

FIG. 1 is a schematic block diagram showing an embodiment of a portable computer 10 in accordance with this invention. Mounted on a CPU card 11 are a CPU 13, a memory/PCI control chip 15, and an L2 cache 17. As the CPU 13, "Mobile Module" of Intel Corp., equipped with "Mobile Pentium II" (made by Intel Corp.), can be selected. To the memory/PCI control chip 15, a video card 21 comprising a video controller 22 and a video memory 24 is connected via an AGP (Accelerated Graphics Port) for processing a drawing instruction sent from a microprocessor 13. To the video card 21, an LCD 23 is connected for displaying on its screen drawing data processed by the video card 21. Also, to the memory/PCI control chip 15, a main memory 19 is connected for temporarily storing an application program associated with an operation of the CPU 13, an operating system (OS) and data.

The CPU card 11 is connected to a planar board 25 via a PCI bus 27, to which a variety of PCI devices (to be described below) are connected. A PCI/PCI bridge 31 is used for connection with a docking station, and it performs a protocol conversion for communicating with an expansion device. A multifunction PCI device 33 is a semiconductor chip, which is capable of implementing the PCI/ISA bridge function, the PCI/IDE function, the USB host/hub function and the advanced power management function respectively. As the multifunction PCI device 33, "PIIX4" available from Intel Corp. can be selected. To the multifunction PCI device 33, a USB (Universal Serial Bus) 34, an HDD 35 and a DVD 37 are connected. The HDD 35 and DVD 37 can be removably mounted on a multi-bay. A CardBus controller 39 is a dedicated controller for outputting signals on the PCI bus 27 onto a slot 40. An audio controller 41 is a dedicated controller for inputting/outputting audio signals to/from the PCI bus 27. Further, a modem card 43 is connected to the PCI bus 27 for controlling a data transfer between the computer 10 and a public telephone line.

Figure 8:
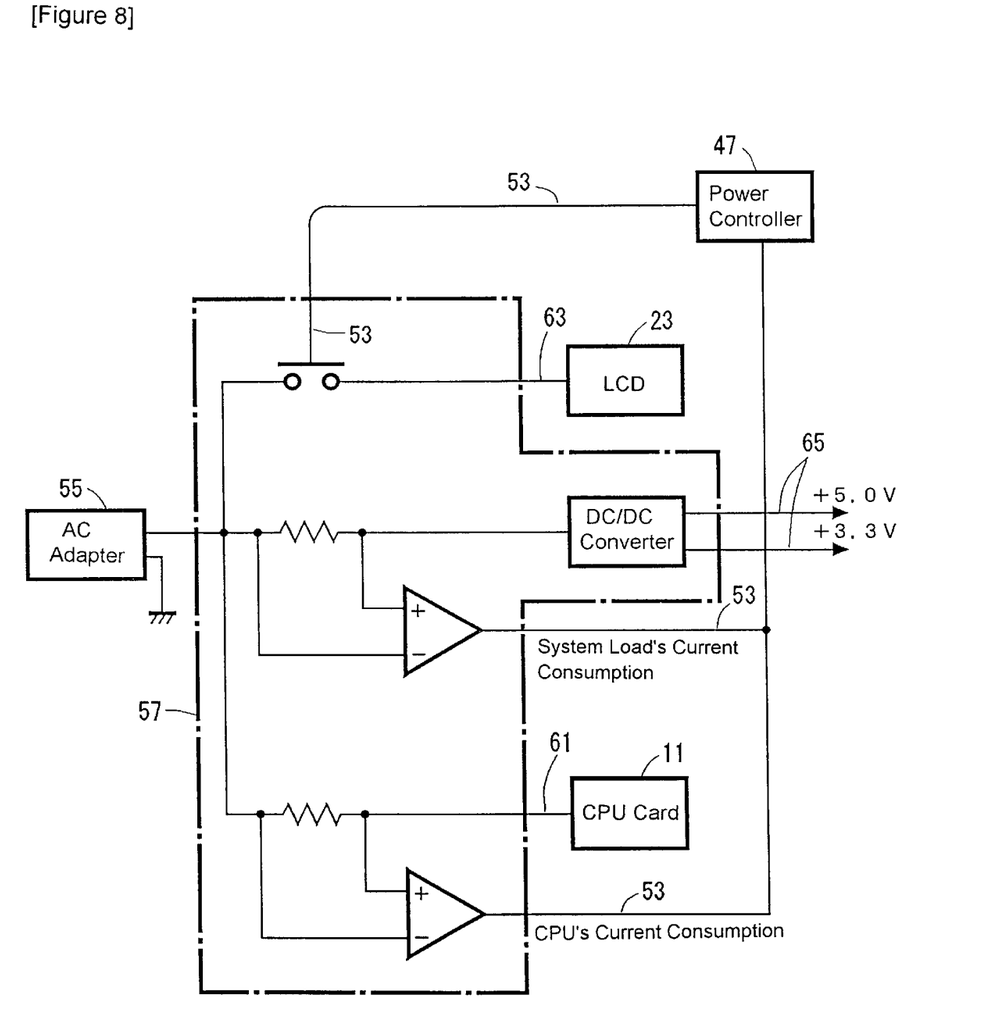
FIG. 8 is a drawing showing an embodiment of a current detection circuit.

A multimedia card 29 uses hardware to reproduce (play back) animation data from a DVD or a CD-ROM on the LCD 23 at a high speed. Also, it performs inputting of video signals and outputting of image data to a television. To the multifunction PCI device 33, an ISA bus 46 is connected, to which a power controller 47 is connected. The power controller 47 is a single-chip microcomputer, which is primarily used for performing power management and/or thermal management within the system 10. As the power controller 47, "H8/300" chip available from Hitachi, Ltd. can be selected. The power controller 47 is provided with an MPU, a RAM, a ROM, a timer, and the like. This ROM is used for storing those programs and reference tables, which are required for performing the power management and/or thermal management. Further, the power controller 47 is provided with one or more I2C (Inter-Integrated Circuit) bus interfaces for connecting I2C buses 49, 53 respectively. Each of the I2C buses is independent of another bus within the computer system 10, so that it can be used for monitoring and controlling functions of a plurality of devices within the computer 10. The I2C bus 49 is connected to thermal sensors (not shown), which are mounted on the CPU card 11, DC/DC card 57, video card 21, multimedia card 29, planar board 25, main battery 59 and auxiliary battery 60 respectively. On the other hand, the I2C bus 53 is connected to each current detector in the DC/DC card 57 for detecting currents of lines 61 and 65. FIG. 8 shows an embodiment of a current detection circuit in the DC/DC card 57. In this drawing, the same reference numbers as those of FIG. 1 indicate the same elements as shown in FIG. 1, and for brevity of description herein, these elements are not described again.

An AC adapter 55 converts the commercial power supply of AC100V to DC16V for feeding the same to the DC/DC card 57. Further, the DC/DC card 57 is provided with a battery charger for recharging the batteries 59, 60, whereby it can accept power from the batteries when the AC adapter 55 is not in use. The DC/DC card 57 accepts the DC16V fed from the AC adapter 55 or DC9.0V to DC12.6V fed from the batteries 59, 60 to generate a regulated voltage to be used in the computer system 10, thereby feeding the power to the CPU card 11, LCD 23 and base loads via typical power feeding lines 61 to 65. The base loads, i.e., a set of loads, comprises a plurality of load components except the CPU card 11 and LCD 23.

Here, we will describe characteristics of power consumption of three different loads, which are connected to power feeding lines 61 to 65 of FIG. 1 respectively. Power consumption of the CPU 13, which is mounted on the CPU card 11, depends on a type of an executing application program and an execution state. Briefly, when the main memory 19 is accessed at a high frequency in order to successively process a large amount of data, power consumption of the CPU 13 increases. Conversely, during a so-called "idle" period, i.e., while any actual operation is not being executed to wait for a key entry or another data entry from a peripheral device, its power consumption decreases. Thus, in a usual case, power consumption of the CPU 13 varies in a short period of time. During the normal operation mode, maximum power consumption of the CPU 13 is 10 W. On the contrary, when exemplary duty cycles for the throttling are set to 75%, 50%, 25% respectively, its maximum power consumption turns out to be 7.5 W, 5.0 W, 2.5 W respectively.

In the present embodiment, power consumption of the CPU 13 is controlled by making use of the throttling mode, which comprises a plurality of duty cycles, as well as the suspend mode. Whenever an operation mode of the CPU 13 is determined, maximum power consumption of the CPU 13 (except the suspend mode) is determined such that, even in a case of processing the same object, respective execution rate and actual power consumption vary. By way of example, it is assumed here that the CPU 13 running at the normal operation mode for processing an object actually consumes 8 W. If, under this assumption, the operation mode is changed to the throttling mode of a duty cycle of 50%, then actual power consumption will turn out to be 4 W and the processing time will be doubled.

Since the LCD 23 is provided with a back light, brightness of its panel surface can be adjusted by adjusting brightness of the back light. Setting the brightness to a higher level, a larger amount of power is consumed accordingly. In short, a variation in its power consumption in accordance with a variation in the brightness is relatively large. As for the LCD 23 of the present embodiment, its maximum power consumption at the maximum brightness is 10 W, whereas its maximum power consumption at the minimum brightness is 1 W. Normally, adjustment of brightness of the LCD 23 can be made by a user at any time in accordance with his/her preference independently of power consumption states of the computer system 10. For the purpose of implementing this invention, the computer 10 of the present embodiment is arranged such that not only the user but also the system is allowed to adjust brightness of the LCD 23. When the system sets up brightness, the brightness adjustment function of the user is to be stopped.

The base loads comprise a plurality of devices within the computer 10, i.e., all of the loads except the CPU 13 and LCD 23 shown in FIG. 1. However, in an exceptional case accompanying an explicit note, they may comprise the LCD 23 as well. In the personal computer 10, its power consumption widely varies instantaneously when a PC card is inserted into the slot 40 of FIG. 1 for connecting a FAX modem, a device that consumes power of the system 10 is connected to the USB 34, and the HDD 35 and/or DVD 37 is mounted/dismounted to/from the multi-bay. However, once those peripheral devices are fixed, a variation of power consumption of the base loads is gentle or mild in comparison that of the CPU 13.

Figure 2:
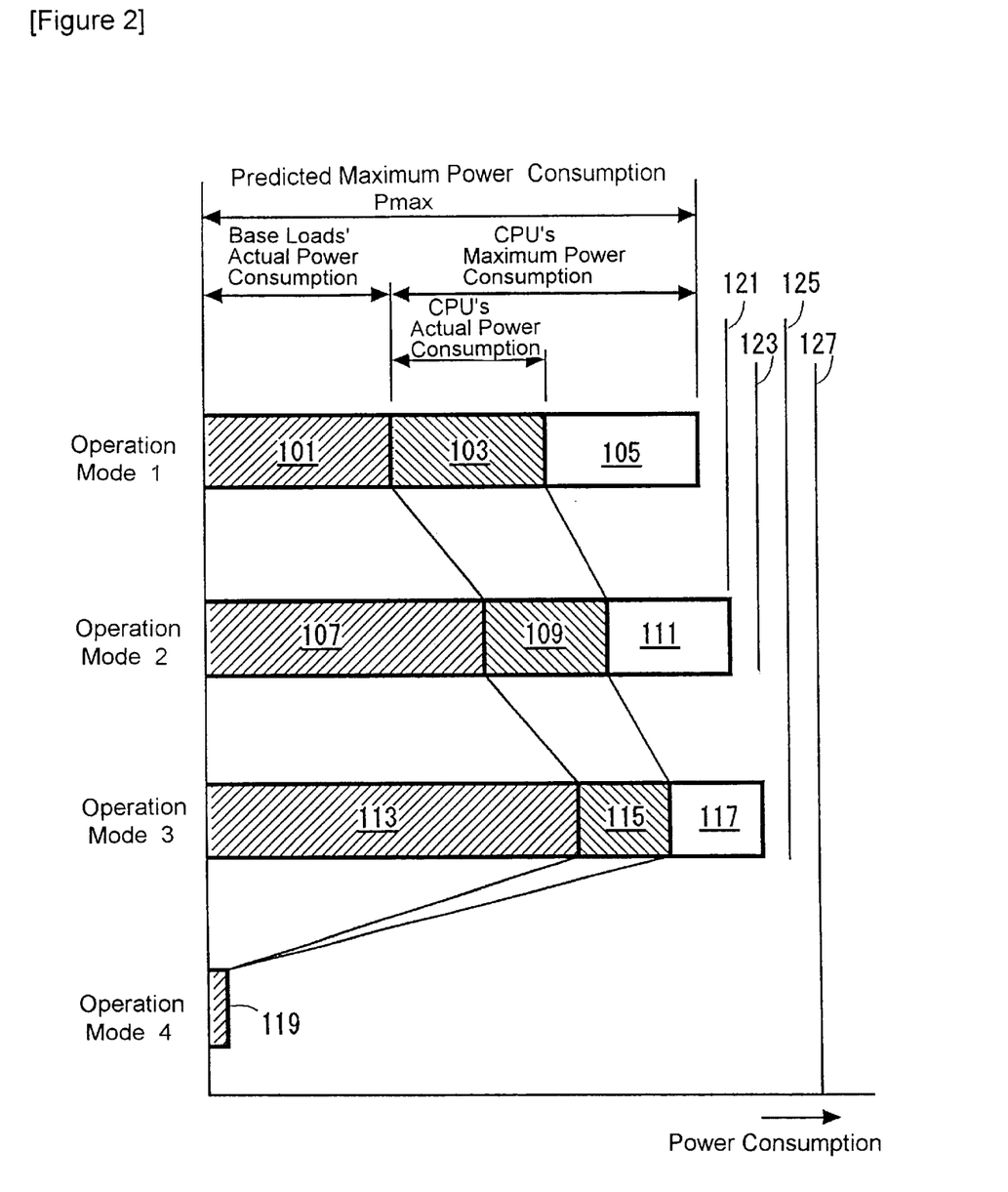
FIG. 2 is a drawing illustrating a method of controlling power consumption, as a first embodiment of this invention.

Next, we will describe a first embodiment of a method of controlling power consumption by making use of the system 10 shown in FIG. 1. FIG. 2 shows a situation where power consumption of the computer 10 is controlled by means of changing the four operation modes of the CPU 13 from one to another. The operation mode 1 is the normal operation mode, wherein the CPU 13 can exert its full performance. Its maximum power consumption is largest among others, and amounting to 10 W. The operation mode 2 is the throttling mode of duty cycle 50%, wherein the CPU 13 runs 50% of the entire time, and feeding of clocks is stopped for the remaining time. Its maximum power consumption is 5.0 W. The operation mode 3 is the throttling mode of duty cycle 25%, wherein the CPU 13 runs only 25% of the entire time. Its maximum power consumption is 2.5 W. Finally, the operation mode 4 is the suspend mode, wherein the CPU 13 is completely stopped so as not to consume any power.

Each area 101, 107, 113 shows actual power consumption of the base loads. The base loads comprise the LCD 23, with its power consumption being varied in accordance with its brightness (from 1 W at the minimum brightness to 10 W at the maximum brightness), as well as other internal loads of the computer 10, with their power consumption being varied from 5 W to 45 W. Thus, power consumption of the base loads varies from 6 W to 55 W as a whole. Each area 103, 109, 115 shows actual power consumption of the CPU 13, whereas each area 105, 111, 117 shows a difference between maximum power consumption and actual power consumption of the CPU 13 respectively. In other words, each difference shows such power that may be further consumed depending on a content of an executing program. Thus, each of sums of the areas 103 and 105, areas 109 and 111, and areas 115 and 117 corresponds to maximum power consumption of the CPU 13 in each operation mode. A sum of the actual power consumption of the base loads and the maximum power consumption of the CPU 13 corresponds to the predicted maximum power consumption (Pmax).

A line 121 shows a reference power value (50 W) at the time of changing the operation mode 1 to the operation mode 2 as a result of an increase of power consumption of the base loads, a line 123 shows a reference power value (52 W) at the time of changing the operation mode 2 to the operation mode 3, a line 125 shows a reference power value (55 W) at the time of changing the operation mode 3 to the operation mode 4, and a line 127 shows the allowable power value (56 W) of the AC adapter 55, which is power consumption of the computer 10 to be managed in the present embodiment. In the present embodiment, these reference power values, which are used at the time of changing an operation mode of the CPU 13 in such a direction as to increase its maximum power consumption as a result of a decrease of power consumption, are different from the reference power values shown by the lines 121, 123, 125. This is shown in FIG. 3.

Figure 3:
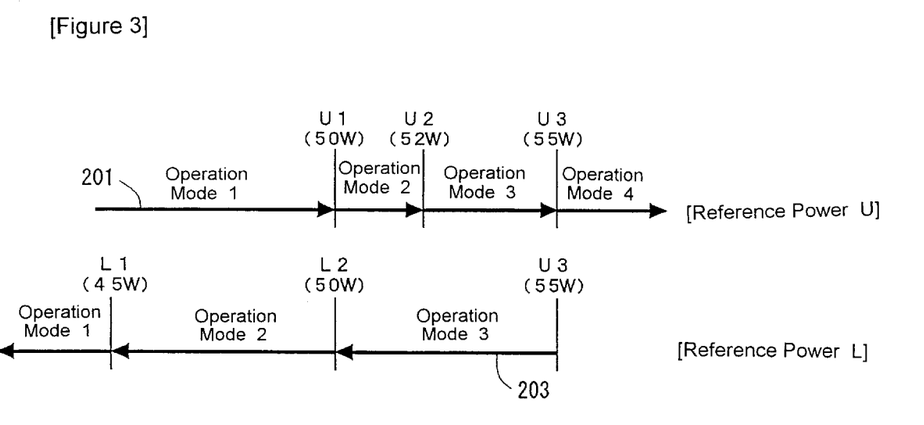
FIG. 3 is a drawing showing an embodiment of reference power.

Referring to FIG. 3, each reference power value on a line 201 is applied, whenever power consumption of the base loads increases and, thus, an operation mode of the CPU 13 is changed in such a direction as to decrease its maximum power consumption. On the other hand, each reference power value on a line 203 is applied, whenever power consumption of the base loads decreases and, thus, an operation mode of the CPU 13 is changed in such a direction as to increase its maximum power consumption. Shown on the line 201 are: a reference power value U1 (corresponding to 50 W on the line 121) for use in changing the operation mode 1 to the operation mode 2, a reference power value U2 (corresponding to 52 W on the line 123) for use in changing the operation mode 2 to the operation mode 3, and a reference power value U3 (corresponding to 55 W on the line 125) for use in changing the operation mode 3 to the operation mode 4. On the other hand, shown on the line 203 are: the reference power value U3 (55 W) that is an upper limit of the operation mode 3, a reference power value L2 (50 W) for use in changing the operation mode 3 to the operation mode 2, and a reference power value L1 (45 W) for use in changing the operation mode 2 to the operation mode 1. As described below in detail, the operation mode 4 is not changed to the operation mode 3 in the present embodiment.

Figure 4:
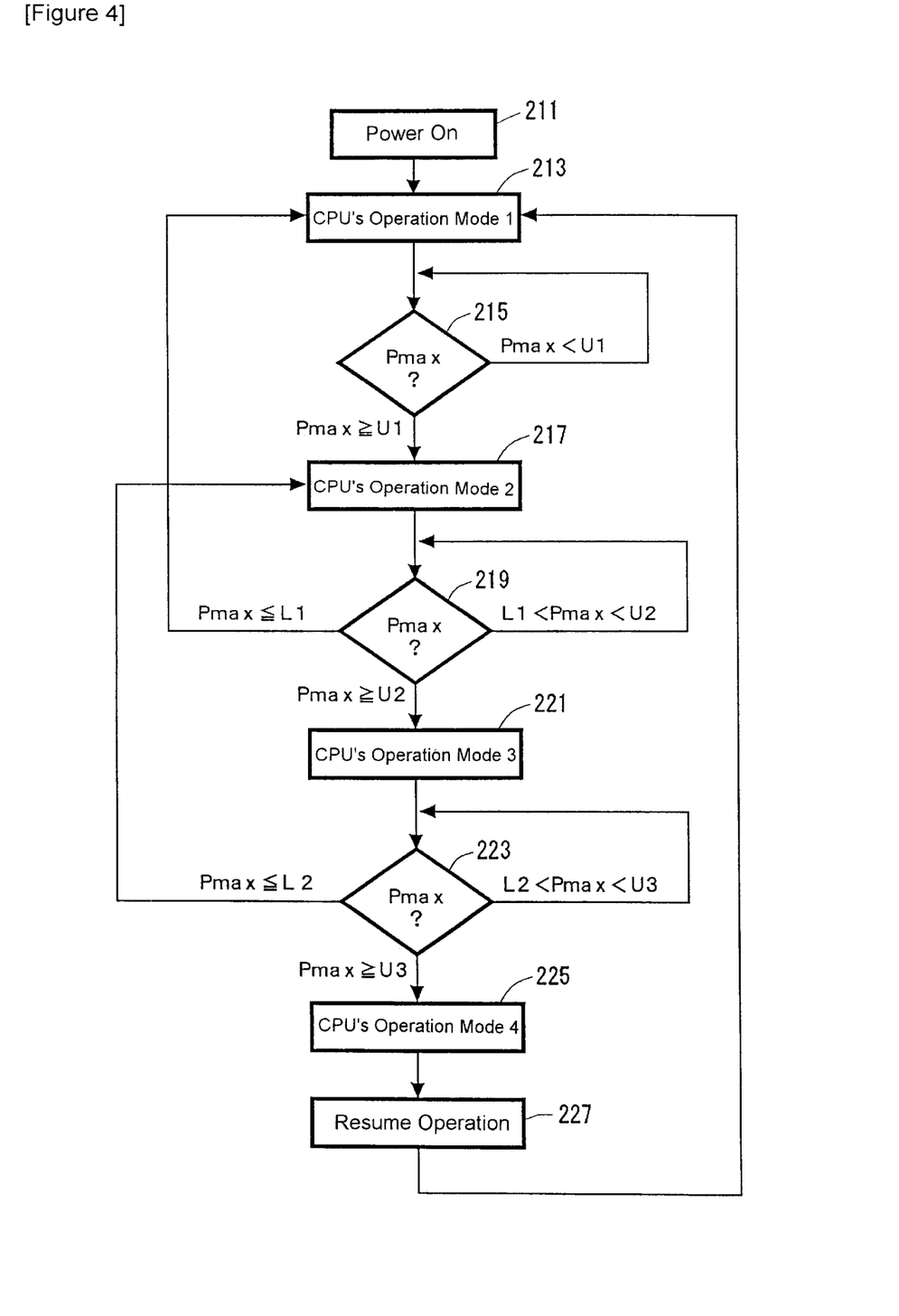
FIG. 4 is a flow chart showing a control procedure of the first embodiment.

FIG. 4 shows a flow chart illustrating a procedure for controlling power consumption in accordance with the first embodiment. The computer 10, with its power supply being turned on at block 211, has a relatively small amount of actual power consumption of the base loads as shown by the area 101, and the CPU 13 starts to run in the operation mode 1 at block 213. Actual power consumption of the CPU 13, as shown by the area 103, is varying in accordance with an executing program within the range of maximum power consumption of the CPU 13. If, at block 215, actual power consumption of the base loads as shown by the area 101 increases and, thus, the Pmax exceeds the reference power value U1, then the CPU 13 is changed to the operation mode 2, and the process proceeds to block 217 for causing the Pmax to be decreased. Unless the Pmax exceeds the reference power value U1 at block 215, the CPU 13 continues to run in the operation mode 1.

If actual power consumption of the base loads as shown by the area 107 increases further and, thus, the Pmax in the operation mode 2 of the CPU 13 exceeds the reference power value U2 at block 219, then the CPU 13 is changed to the operation mode 3, and the process proceeds to block 221 for causing the Pmax to be decreased. On the other hand, if the Pmax is decreased below the reference power value L1 at block 219, then the CPU 13 is changed to the operation mode 1, and the process return to block 213. The CPU 13 continues to run in the operation mode 2, so long as the Pmax is maintained at a level between the reference power values L1 and U2.

If actual power consumption of the base loads as shown by the area 113 increases further and, thus, the Pmax in the operation mode 3 of the CPU 13 exceeds the reference power value U3 at block 223, then feeding of clocks to the CPU 13 is stopped, the CPU 13 is changed to the operation mode 4, and the computer 10 is stopped at block 225. The area 119 of FIG. 2 shows power consumption of the suspend mode, which is necessary to maintain states of the memory that have existed immediately before changing to the operation mode 4 and to cause the interrupt circuit to be properly operated. If, at block 223, the Pmax is determined to be equal to or less than the reference power value L2, then the CPU 13 is changed to the operation mode 2, and the process proceeds to block 217. The CPU 13 continues to run in the operation mode 3, so long as the Pmax is maintained at a level between the reference power values L2 and U3. If the CPU 13 enters the suspend mode of the operation mode 4, any keying operation or pointing device's operation normally causes the interrupt circuit to be operated for feeding clocks to the CPU 13, thereby to restore the computer 10 to its state that has existed before entering block 225. Thereafter, however, the process proceeds to block 213 for causing the CPU 13 to resume its operation from the operation mode 1.

Figure 9:
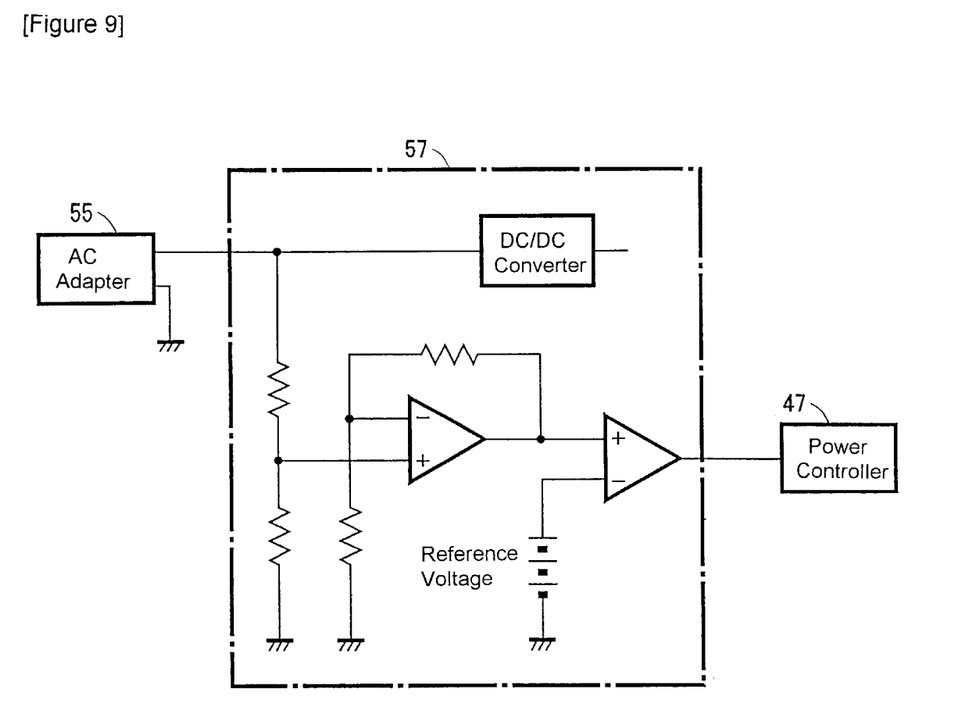
FIG. 9 is a drawing showing an embodiment of an overload detection circuit.

As mentioned above, the base loads shown in FIG. 2 comprise the LCD 23, with its power consumption being varied from 1 W to 10 W in accordance with its brightness, which can be changed by the user depending on his/her preference. It is assumed here that the predicted maximum power consumption exhibits a value near to a reference power value as a result of an increase of the base loads. If, under this assumption, the user causes brightness of the LCD 23 to be suddenly increased and, thus, power consumption of the LCD 23 is increased accordingly, then it may happen that a sum of actual power consumption of the base loads and actual power consumption of the CPU 13 exceeds the allowable power value shown by the line 127, prior to changing the current operation mode of the CPU 13 to another operation mode for causing its maximum power consumption to be decreased. In the present embodiment, this problem can be solved by means of balancing a period of time (several tens of milliseconds) against the short-time over current capability of the AC adapter 55. FIG. 9 shows an embodiment of an overload detection circuit of the AC adapter 55. Note in this respect that whenever the AC adapter 55 feeds power in excess of the allowable power, its output voltage is decreased. In such a case, the circuit of FIG. 9 built into the DC/DC card 57 compares the output voltage with a reference voltage, thereby to inform the power controller 47 that the output voltage has been decreased.

Figure 5:
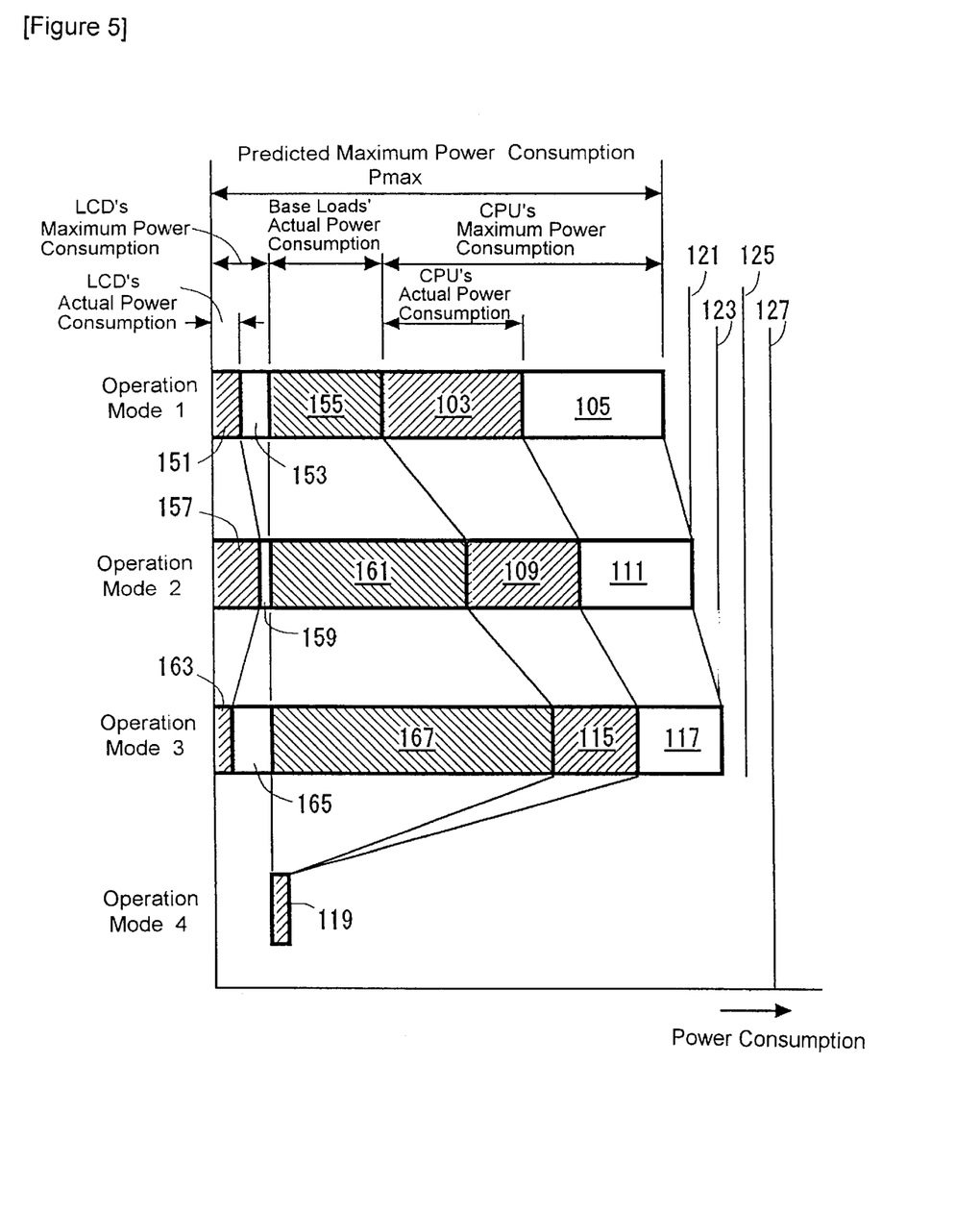
FIG. 5 is a drawing illustrating a method of controlling power consumption, as a second embodiment of this invention.

FIG. 5 shows a second embodiment, which is arranged to separate power consumption of the LCD 23 from power consumption of the base loads, as shown in FIG. 2, for controlling power consumption of the computer 10. In this drawing, the same reference numbers as those of FIG. 2 indicate the same elements as shown in FIG. 2, and for brevity of description herein, these elements are not described again. Each area 151, 157, 163 shows actual power consumption of the LCD 23, which is associated with a brightness level of the LCD 23 set up by the user respectively. Each area 153, 159, 165 shows a difference between maximum power consumption of the LCD 23 at its maximum brightness and actual power consumption respectively. Each area 155, 161, 167 shows actual power consumption of the base loads except power consumption of the LCD 23.

Note here that the Pmax in the second embodiment is calculated as a sum of maximum power consumption of the LCD 23, actual power consumption of the base loads except that of the LCD 23, and maximum power consumption of the CPU 13 in each operation mode thereof. Maximum power consumption of the LCD 23 is constant, whereas actual power consumption of the base loads varies depending on an operating state of the computer 10, and maximum power consumption of the CPU 13 is determined by its operation mode. Thus, even if the brightness of the LCD 23 is suddenly changed, actual power consumption of the computer 10 does not exceed the allowable power value 127, so long as the base loads do not suddenly change. This is because maximum power consumption of the LCD 23 is included as a portion of the Pmax. Since the procedure for controlling power consumption in accordance with the second embodiment is similar to that of the first embodiment having been described with reference to FIGS. 3 and 4, it is not specifically described herein. In the second embodiment, actual power consumption of the computer 10 is so controlled as to lessen its possibility of exceeding the capacity of the AC adapter 55 than that of the first embodiment. Thus, it is preferable that the first embodiment be applied to such an environment, wherein power can be fed from both of the AC adapter 55 and one or more batteries, and wherein power can be supplemented from the batteries in a case that power consumption exceeds the capacity of the AC adapter 55. On the contrary, it is preferable that the second embodiment be applied to such an environment, wherein power is solely fed from the AC adapter 55.

Figure 6:
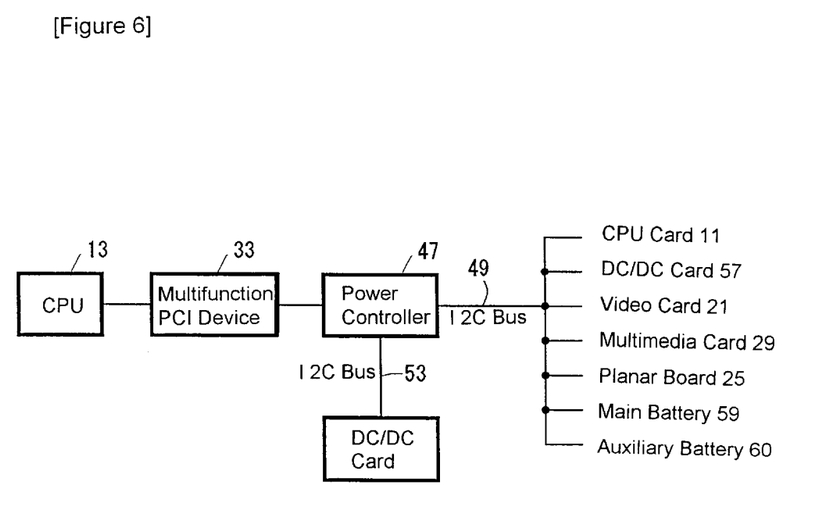
FIG. 6 is a drawing showing an embodiment of a power consumption control system in accordance with this invention.

Referring now to FIG. 6, there is shown an embodiment of a power consumption control system adapted for implementing this invention. In this drawing, the same reference numbers as those of FIG. 1 indicate the same elements as shown in FIG. 1, and for brevity of description herein, these elements are described herein in a simple manner. The control of power consumption of this invention can be implemented by making use of a well-known thermal management system. The term "thermal management system" refers to such a system, which monitors temperatures at key locations within a computer, and exercises a cooling function or restricts loads of the computer in response to a temperature rise, thereby protecting the computer from thermal damages. Connected to the power controller 47 are thermal sensors, each being mounted on the CPU card 11, DC/DC card 57, video card 21, multimedia card 29, planar board 25, main battery 59 and auxiliary battery 60 respectively, for acquiring temperature information at the respective locations. As a thermal sensor, "LM75" available from National Semiconductor Corp. may be used. The power controller 47 stores in its ROM a program for executing the thermal management, a reference table 250 shown in FIG. 7, and such data of maximum power consumption of the CPU 13 in its each operation mode.

Further, connected to the power controller 47 are DC/DC card 57, together with the I2C bus 53 for detecting current values of the CPU 13, LCD 23 and other system loads. In the reference table 250, thermal levels are classified into five levels "1" to "5", whereby various thermal operations (fan operation, throttling 50%, throttling 25%, suspend, and power off) are defined under these thermal levels respectively. The thermal levels 1 to 4 (ranging from the fan operation to the suspend) correspond to the operation modes 1 to 4 of the CPU 13, described above with reference to FIGS. 2 to 4, respectively. The fan operation at the thermal level 1 is used for air cooling inside of the computer, and the CPU 13 runs in the normal state at the thermal level 1 or below. In the reference table 250, a set of a temperature (marked "enable") for activating an associated thermal level and another temperature (marked "disable") for stopping the associated thermal level is defined for each of the mounting locations of the thermal sensors respectively, whereby a thermal level may be automatically changed in accordance with a temperature rise detected by a thermal sensor for preventing a temperature from rising further. Moreover, in the reference table 250, predicted maximum power consumption (Pmax) for use in practicing this invention and its reference power values are defined. If the Pmax is increasing, a reference power value as defined in the column labeled "Enable" is referred to for changing a thermal level, i.e., an operation mode of the CPU 13. For example, the CPU 13 runs in the normal operation mode until 50 W are reached at, whereupon this operation mode is changed to the throttling 50%, and then to the throttling 25% at 52 W, finally to the suspend at 55 W. Conversely, if the Pmax is decreasing, a reference power value as defined in the column labeled "Disable" for each thermal operation is referred to for changing the operation modes of the CPU 13.

Figure 7:
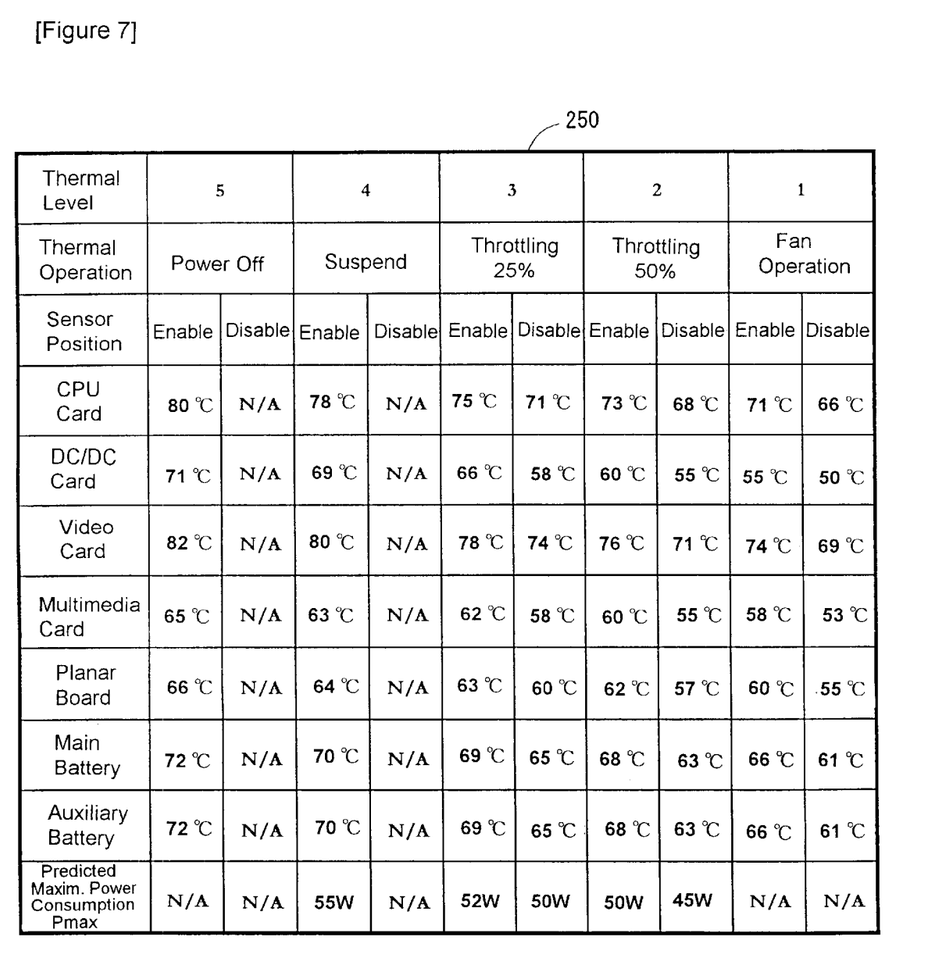
FIG. 7 is a drawing showing an embodiment of a thermal management table in accordance with this invention.

The power controller 47, which functions independently of the CPU 13, sequentially reads data of each thermal sensor and a current value of the DC/DC card 57, and compares them with contents of the reference table 250. Also, the power controller 47 stores information about the current operation mode of the CPU 13 into a RAM, and then calculates the Pmax from the read current value and maximum power consumption in the current operation mode of the CPU 13. If it is detected that the Pmax value has been deviated from the "Enable" or "Disable" value in the current thermal level, then the power controller 47 sends a signal to the multifunction PCI device 33, thereby to activate an SCI (System Control Interrupt) bit in a register of the multifunction PCI device 33 for sending an interrupt signal to the CPU 13. The CPU 13 now reads the SCI bit from the register of the multifunction PCI device 33, executes software called ACPI (Advanced Configuration and Power Interface) that forms a portion of the OS, and upon detection of the interrupt signal from the power controller 47, it passes the control to a BIOS called "ASL" (API Source Language) that is stored in the system ROM.

If the ASL determines that it is necessary to change an operation mode of the CPU 13, then a command is sent to the power controller 47 for causing another command for changing an operation mode of the CPU 13 to be sent to the multifunction PCI device 33, and sets up the multifunction PCI device 33 into a condition for receiving the said command. Having received the command, the power controller 47 activates a THRM# bit in a resister of the multifunction PCI device 33. Thus, the multifunction PCI device 33 controls such that the CPU 13 runs in a predetermined operation mode. On the other hand, in case of changing brightness of the LCD 23, a reference power value for changing the brightness of the LCD 23 is written into the reference table 250, whereby the power controller 47 and multifunction PCI device 33 execute power control in the similar procedure.

While this invention has been illustrated by the description of the embodiments that make use of the thermal management function, this invention is not limited to the use of a thermal management system. This is because this invention may be implemented by using a dedicated means or another device within the computer.

As described above, this invention has made it possible to provide a method and an apparatus for predicting maximum power consumption of an electronic apparatus and for dynamically controlling power consumption of a portion of its loads in response to the predicted result, thereby to limit its power consumption to a predetermined value or less. Also, this invention has made it possible to provide a method and an apparatus for predicting maximum power consumption of a computer and for temporarily changing a function of its CPU or LCD in response to the predicted result while the computer is operating to control its power consumption, thereby limiting its power consumption thereof to a predetermined value or less.

Further, this invention has made it provide a method and an apparatus adapted for use in an electronic apparatus, which is fed power by a given AC adapter, for effectively making use of capacity of the adapter without needlessly increasing the capacity thereof.

We claim:

1. A method of controlling power consumption of a computer, which is provided with base loads comprising a plurality of components, and a CPU including a plurality of operation modes associated with power consumption thereof, the method comprising the steps of:
    obtaining predicted maximum power consumption of said computer from actual power consumption of said base loads and maximum power consumption in a current operation mode of said CPU;
    providing reference power;
    comparing said predicted maximum power consumption with said reference power; and
    changing the operation mode of said CPU in response to said comparing step.

2. The method of claim 1, wherein the operation modes of said CPU includes either one of operation modes or a combination of plural operation modes selected from the group consisting of a throttling mode, a clock-down mode, a standby mode and a suspend mode.

3. The method of claim 1, further comprising the step of adjusting brightness of a display device of said computer in response to said comparing step.

4. The method of claim 1, further comprising the step of changing the operation mode of said CPU, when a sum of the actual power consumption of said base loads and the actual power consumption of said CPU exceeds the reference power of said computer.

5. A method of controlling power consumption of a computer, which is provided with base loads comprising a plurality of components, a display device with its brightness being adjustable, and a CPU including a plurality of operation modes associated with power consumption thereof, the method comprising the steps of:
    obtaining predicted maximum power consumption of said computer from actual power consumption of said base loads, maximum power consumption associated with the brightness of said display device, and maximum power consumption in a current operation mode of said CPU;
    providing reference power;
    comparing said predicted maximum power consumption with said reference power; and
    changing the operation mode of said CPU in response to said comparing step.

6. The method of claim 5, wherein the operation modes of said CPU includes either one of operation modes or a combination of plural operation modes selected from the group consisting of a throttling mode, a clock-down mode, a standby mode and a suspend mode.

7. The method of claim 5, further comprising the step of adjusting the brightness of said display device in response to said comparing step.

8. The method of claim 5, further comprising the step of changing the operation mode of said CPU and/or the brightness of said display device, when a sum of the actual power consumption of said base loads, the actual power consumption of said display device, and the actual power consumption of said CPU exceeds the reference power of said computer.

9. A computer that is provided with base loads comprising a plurality of components, and a CPU including a plurality of operation modes associated with power consumption thereof, comprising:
    means for obtaining predicted maximum power consumption of said computer from actual power consumption of said base loads and maximum power consumption in a current operation mode of said CPU;
    means for providing reference power;
    means for comparing said predicted maximum power consumption with said reference power; and
    means for changing the operation mode of said CPU in response to said comparing means.

10. The computer of claim 9, wherein the operation modes of said CPU includes either one of operation modes or a combination of plural operation modes selected from the group consisting of a throttling mode, a clock-down mode, a standby mode and a suspend mode.

11. The computer of claim 9, further comprising means for adjusting brightness of a display device of said computer in response to said comparing means.

12. The computer of claim 9, further comprising means for changing the operation mode of said CPU, when a sum of the actual power consumption of said base loads and the actual power consumption of said CPU exceeds the reference power of said computer.

13. A computer that is provided with base loads comprising a plurality of components, a display device with its brightness being adjustable, and a CPU including a plurality of operation modes associated with power consumption thereof, comprising:

means for obtaining predicted maximum power consumption of said computer from actual power consumption of said base loads, the maximum power consumption associated with the brightness of said display device, and maximum power consumption in a current operation mode of said CPU;

means for providing reference power;

means for comparing said predicted maximum power consumption with said reference power; and means for changing the operation mode of said CPU in response to said comparing means.

14. The computer of claim 13, wherein the operation modes of said CPU includes either one of operation modes or a combination of plural operation modes selected from the group consisting of a throttling mode, a clock-down mode, a standby mode and a suspend mode.

15. The computer of claim 13, further comprising means for adjusting the brightness of said display device in response to said comparing means.

16. The computer of claim 13, further comprising means for changing the operation mode of said CPU and/or the brightness of said display device, when a sum of the actual power consumption of said base loads, the actual power consumption of said display device, and the actual power consumption of said CPU exceeds the reference power of said computer.

17. A computer that is provided with base loads comprising a plurality of components, and a CPU including a plurality of operation modes associated with power consumption thereof, comprising:

a power controller for calculating predicted maximum power consumption of said computer from actual power consumption of said base loads, and maximum power consumption in a current operation mode of said CPU, and for comparing it with reference power to generate a signal for changing the operation mode of said CPU; and a device for receiving the signal from said power controller to change the operation mode of said CPU.

* * * * *